United States Patent Office 2,743,276
Patented Apr. 24, 1956

2,743,276

(2,2-DIMETHYL-3-HYDROXY-PROPYLIDENE-1) HYDRAZONE OF ISONICOTINIC ACID HYDRAZIDE

Floyd E. Anderson, Yonkers, N. Y.

No Drawing. Application October 10, 1952,
Serial No. 314,220

1 Claim. (Cl. 260—295)

This invention relates to certain novel compounds having therapeutic activity and relates, more particularly, to compounds having desirable antitubercular activity.

The serious public health problem involved and the prolonged period necessary for the treatment of tuberculosis has spurred research aimed at the development of chemo therapeutic agents useful for combatting tuberculosis. Treatment with compounds such as streptomycin, para-amino salicylic acid and isonicotinic acid hydrazide have shown some promise in conjunction with other therapy. Research has continued with the ultimate goal being the development of more useful and more satisfactory therapeutic compounds.

I have now found that hydrazone compounds of the following structure

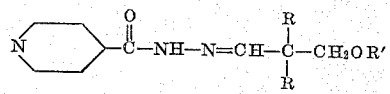

wherein R is a hydrogen, hydroxy, alkyl, alkoxy or hydroxymethylene group and R' is hydrogen or an alkyl group, are useful and well-tolerated chemotherapeutic agents for the treatment of tuberculosis. These compounds exhibit very desirable antitubercular activity both in vivo and in vitro against mycobacterium tuberculosis.

The novel hydrazone compounds of my invention may be obtained by reacting isonicotinic acid hydrazide with an aliphatic aldehyde of the following structure:

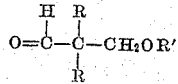

wherein R is a hydrogen, hydroxy, alkyl, alkoxy or hydroxymethylene group and R' a hydrogen or an alkyl group. The substituents R in said intermediate aldehyde compound may be the same or different groups. When R is an alkyl or alkoxy group, the alkyl group linked to the carbon chain by either a carbon or oxygen linkage in said aldehyde compound may be, for example, a methyl, ethyl, propyl and isopropyl group.

The reaction whereby said hydrazone compounds are obtained may be carried out in an aqueous medium. Isonicotinic acid hydrazide and the desired aldehyde compound are added to an aqueous solvent, which may be water or an aqueous solution of ethyl alcohol, methyl alcohol or dioxane, in approximately stoichiometric proportions and the mixture obtained heated to reaction temperature. The reaction is usually completed after heating on a steam bath for about ½ to 3 hours and, upon cooling the reaction mixture, the hydrazone formed precipitates.

Suitable aldehydes which may be employed in forming the novel compounds of my invention are, for example, alpha,alpha - dimethyl-beta-hydroxy-propionaldehyde, alpha,alpha-dimethyl - beta - methoxy-propionaldehyde, alpha,alpha - dimethyl-beta-ethoxy-propionaldehyde, alpha-methyl-alpha-hydroxymethyl-beta-hydroxy - propionaldehyde, beta-ethoxy-propionaldehyde, beta-methoxy-propionaldehyde, alpha - hydroxy - beta - hydroxy-propionaldehyde, alpha-methoxy-beta-methoxy-propionaldehyde, and alpha-ethoxy-beta-ethoxy-propionaldehyde.

Examples of hydrazone compounds within the scope of my invention are the following: N-isonicotinoyl-N'-(2,2-dimethyl-3-hydroxy-propylidene-1) hydrazine, N-isonicotinoyl-N'-(2 - methyl-2-hydroxymethyl-3-hydroxy-propylidene-1) hydrazine, N-isonicotinoyl-N'-(3-ethoxy-propylidene - 1) hydrazine, N - isonicotinoyl-N'-(3-methoxy-propylidene - 1) hydrazine, N - isonicotinoyl-N'-(2,3 - dihydroxy-propylidene-1) hydrazine, N-isonicotinoyl-N'-(2,3-dimethoxy-propylidene-1) hydrazine, N-isonicotinoyl-N'-(2,2 - dimethyl-3-methoxy-propylidene-1) hydrazine, N-isonicotinoyl-N'-(2,2-dimethyl - 3 - ethoxy-propylidene-1) hydrazine, N-isonicotinoyl-N'-(2,3-diethoxy-propylidene-1) hydrazine, N-isonicotinoyl-N'-(3-hydroxy-propylidene-1) hydrazine.

Valuable compounds are also obtained when the above compounds are reduced and the double bond between the nitrogen and carbon atoms is saturated. Reduction may be readily effected in an aqueous medium in the presence of a platinum or palladium catalyst employing hydrogen as the reducing agent.

In order further to illustrate my invention but without being limited thereto the following example is given:

Example 2.69 parts by weight of isonicotinic acid hydrazide and 2.00 parts by weight of alpha-alpha-dimethyl-beta-hydroxy-propionaldehyde are added to 25 parts by weight of water and the resulting mixture heated upon a steam bath for 2 hours. The hot reaction mixture obtained is then cooled to room temperature and, upon cooling, a white precipitate of N-isonicotinoyl-N'-(2,2 - dimethyl - 3 - hydroxy-propylidene-1) hydrazine is obtained. The product has a melting point of 195–196° C. The melting point is unchanged even after recrystallization from ethanol.

It is understood that the foregoing detailed description is given merely by way of illustration and that many variations may be made therein without departing from the spirit of my invention.

Having described my invention what I desire to secure by Letters Patent is:

What I claim is:

The compound: N-isonicotinoyl-N'-(2,2 - dimethyl-3-hydroxy-propylidene-1) hydrazine.

References Cited in the file of this patent

Selikoff et al.: "The Quart. Bull. of Sea View Hospital," vol. XIII, No. 1, pp. 17–26 (Jan. 1952).